United States Patent
Foxford et al.

(10) Patent No.: US 6,804,589 B2
(45) Date of Patent: Oct. 12, 2004

(54) SYSTEM AND METHOD FOR EFFICIENTLY CAPTURING AND REPORTING MAINTENANCE, REPAIR, AND OVERHAUL DATA

(75) Inventors: Roger A. Foxford, Goodyear, AZ (US); Donald J. Hammer, Phoenix, AZ (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 10/341,619

(22) Filed: Jan. 14, 2003

(65) Prior Publication Data

US 2004/0138792 A1 Jul. 15, 2004

(51) Int. Cl.[7] .................................................. G06F 7/00
(52) U.S. Cl. .......................... 701/29; 707/10; 709/217
(58) Field of Search ............................... 701/1, 29, 30, 701/32, 33, 34, 35, 99, 100; 340/437, 500, 945, 971; 705/5, 16, 24, 37; 713/165, 201; 707/10, 513; 709/217, 223, 232, 207

(56) References Cited

U.S. PATENT DOCUMENTS 6,314,422 B1 * 11/2001 Barker et al. ................. 707/10
6,338,152 B1 * 1/2002 Fera et al. .................. 709/207
6,487,479 B1 * 11/2002 Nelson ......................... 701/29

* cited by examiner

Primary Examiner—Richard M. Camby
(74) Attorney, Agent, or Firm—K. Karen Loewenstein, Esq.

(57) ABSTRACT

A system and method that efficiently captures, stores, and reports aerospace maintenance, repair, and overhaul data, and provides uniformity amongst various systems, parts, and components in the amount and type of data that is captured and stored. A first server computer implements a data capture web application that is used to capture and store aerospace product-related repair and overhaul data in a repair and overhaul data storage database that is accessible by a company's workforce. A portion of the captured data is extracted from the repair and overhaul data storage database and is stored in a customer repair and overhaul data supply database. A second server computer implements a customer interface web application that is used to retrieve the data stored in the customer repair and overhaul data supply database.

33 Claims, 6 Drawing Sheets

SYSTEM AND METHOD FOR EFFICIENTLY CAPTURING AND REPORTING MAINTENANCE, REPAIR, AND OVERHAUL DATA

FIELD OF THE INVENTION

The present invention relates to the storage and reporting of various aerospace product-related repair and overhaul data and, more particularly, to an automated system and method for capturing and reporting various aircraft aerospace product-related repair and overhaul data related to aircraft product maintenance, repair, and overhaul.

BACKGROUND OF THE INVENTION

Aircraft and the various systems, parts, and components that make up each aircraft are robustly designed and operate safely. Nonetheless, the parts and components of the aircraft systems may sometimes wear from usage, which may result in the need to remove the system, or portions of the system, from the aircraft, and to analyze, repair, and/or overhaul the removed system or portion thereof. In addition, some aircraft systems, or portions of systems, may be periodically removed from the aircraft and overhauled, as part of a preventive maintenance program.

In one method of implementing aircraft component repair and overhaul service, when a customer sends a system, part or component, such as an aircraft jet engine, to a supplier repair-and-overhaul facility, it is first logged in to a log book (or "Build Book") using some type of identifying indicia such as, for example, a repair order number, an engine model number, a serial number, a customer number, or a combination thereof. A technician then completes an induction form, which is used to record various types of preliminary information about the engine, and various sections of the engine. Such information may include, for example, the reason the engine was returned, descriptions of the physical condition of the engine and its various sections, and any repair parts received with the engine. The amount and type of information may vary with the particular engine model. After the induction form is complete, the technician signs it, places it in the Build Book, and forwards it on for further disposition by an engineer.

The engineer, upon receipt of the Build Book and induction form, may enter this induction data into a local database. The engineer may also determine the amount and type of repairs needed on the engine, and the amount and type of post-repair testing that should be performed on the engine. This engineering disposition data is also recorded entered into a local database. The engine is then repaired and retested, and the results of the post-repair tests are recorded in a database, which may or may not be the same database into which the engineering disposition data is recorded.

Thereafter, the engineer may prepare an engineering report for the customer, which outlines at least the induction findings data generated by the technician, the engineering disposition data, the repair and post-repair test data, and any additional information and/or data that may have been noted during the repair and/or retest of the engine. A copy of the engineering report is then sent to the customer.

Although the above-described process has worked well and has resulted in the successful repair, overhaul, and maintenance of numerous aircraft engines and other systems, parts, and components, it suffers certain drawbacks. For example, when the technician is filling out the induction form, he or she may need to walk back and forth between his or her desk and the physical location of the engine, which can adversely effect efficiency. The amount and type of data that the technician records on an induction form may vary, depending on the particular engine model. Thus, the technician may need to remember all these differences or may need to consult with other technicians, which can reduce efficiency and/or present the possibility of non-recordation of sufficient induction data.

Further, many engineers use different software databases to store the engineering data (e.g., the engineering disposition data and the repair and post repair test data) for the various engines for which each may be responsible, and there is no standard format for recording or accessing the engineering data. Additionally, many of the databases are only local databases, stored on each engineer's individual computers. Thus, some engineers may record differing amounts and types of data, and if another engineer wants access to the engineering data that is the responsibility of another engineer, he or she may not be able to access it, or it may not be recorded or stored at all. Moreover, because the engineering data is not centrally located, and terminology is not standardized, engineering data analysis across customers, products, and product lines may be difficult.

In addition to the above, the format of the customer reports that each engineer generates may not be standardized in either layout or content. This can be inconvenient and potentially confusing for customers, as well as other engineers and managers. Also, some of the engineering data that is entered by an engineer, and which is used in generating a customer report, are identical to data that are, in some instances, stored in other databases that may not be accessible or compatible with the database or other software the engineer is using to generate a customer report. Thus, the engineer may need to enter this data manually, which can be inefficient and increase costs. Moreover, if the customer requests additional data, it may be difficult to collect or find.

Hence, there is a need for a system and method that addresses one or more of the drawbacks noted above. Namely, a system and method that provides uniformity in the amount and type of data that a technician records on an induction form, and/or alleviates the need for a technician to walk back and forth between his or her desk and the physical location of the engine or part, and/or provides consistency in the format, amount, and location of stored engineering data, and/or ready access to engineering data by other engineers, and/or provides standardized content and layout of customer reports, and/or alleviates the need for engineers to enter certain data stored in other related databases, and/or allows engineering data analysis across customers, products, and product lines. The present invention addresses one or more of these drawbacks.

SUMMARY OF THE INVENTION

The present invention provides a system and method for efficiently capturing, storing, and reporting maintenance, repair, and overhaul data. The system and method provides uniformity amongst various systems, parts, and components in the amount and type of data that is captured and stored, and stores the data in a centralized location that is accessible both by a company's workforce and, in some instances, its customers.

In one embodiment, and by way of example only, a system for capturing and reporting aerospace product-related repair and overhaul data includes a first server computer, repair and overhaul data storage database, a customer repair and overhaul data supply database, and a second server computer. The first server computer is operable to transmit one or more user interface web pages that are formatted to display one or more aerospace product-related repair and overhaul queries and associated data entry regions, each of which is formatted to receive aerospace product-related repair and overhaul data that is entered therein from a client computer that is in operable communication with the first server computer and that is displaying one or more of the user interface web pages. The repair and overhaul data storage database is in communication with the first server computer to receive and store at least a portion of the aerospace product-related repair and overhaul data entered into the associated aerospace product-related repair and overhaul data entry regions. The customer repair and overhaul data supply database is coupled to receive and store at least a portion of the aerospace product-related repair and overhaul data from the repair and overhaul data storage database. The second server computer is in communication with the customer repair and overhaul data supply database and is operable, in response to a command from a client computer that is in operable communication with the second server computer, to retrieve and transmit at least a portion of the aerospace product-related repair and overhaul data from the customer repair and overhaul data supply database.

In another exemplary embodiment, a method of capturing and reporting aerospace product-related repair and overhaul data includes transmitting one or more user interface web pages that are formatted to display one or more aerospace product-related repair and overhaul queries and associated data entry regions. Each aerospace product-related repair and overhaul data entry region is formatted to receive aerospace product-related repair and overhaul data that is entered therein from a client computer that is displaying one or more of the user interface web pages. At least a portion of the aerospace product-related repair and overhaul data entered into the associated aerospace product-related repair and overhaul data entry regions is received and stored in a repair and overhaul data storage database. At least a portion of the aerospace product-related repair and overhaul data from the repair and overhaul data storage database is received and stored in a customer repair and overhaul data supply database. At least a portion of the aerospace product-related repair and overhaul data from the customer repair and overhaul data supply database is retrieved and transmitted, in response to a command from a client computer.

In still another exemplary embodiment, a computer-readable storage medium containing computer executable code for instructing one or more server computers to perform the steps of transmitting one or more user interface web pages that are formatted to display one or more aerospace product-related repair and overhaul queries and associated data entry regions. Each aerospace product-related repair and overhaul data entry region is formatted to receive aerospace product-related repair and overhaul data that is entered therein from a client computer that is displaying one or more of the user interface web pages. At least a portion of the aerospace product-related repair and overhaul data entered into the associated aerospace product-related repair and overhaul data entry regions is received and stored in a repair and overhaul data storage database. At least a portion of the aerospace product-related repair and overhaul data from the repair and overhaul data storage database is received and stored in a customer repair and overhaul data supply database. At least a portion of the aerospace product-related repair and overhaul data from the customer repair and overhaul data supply database is retrieved and transmitted, in response to a command from a client computer.

Other independent features and advantages of the preferred data capturing and reporting system and method will become apparent from the following detailed description, taken in conjunction with the accompanying drawings which illustrate, by way of example, the principles of the invention.

DETAILED DESCRIPTION OF A PREFERRED EMBODIMENT

Figure 1:
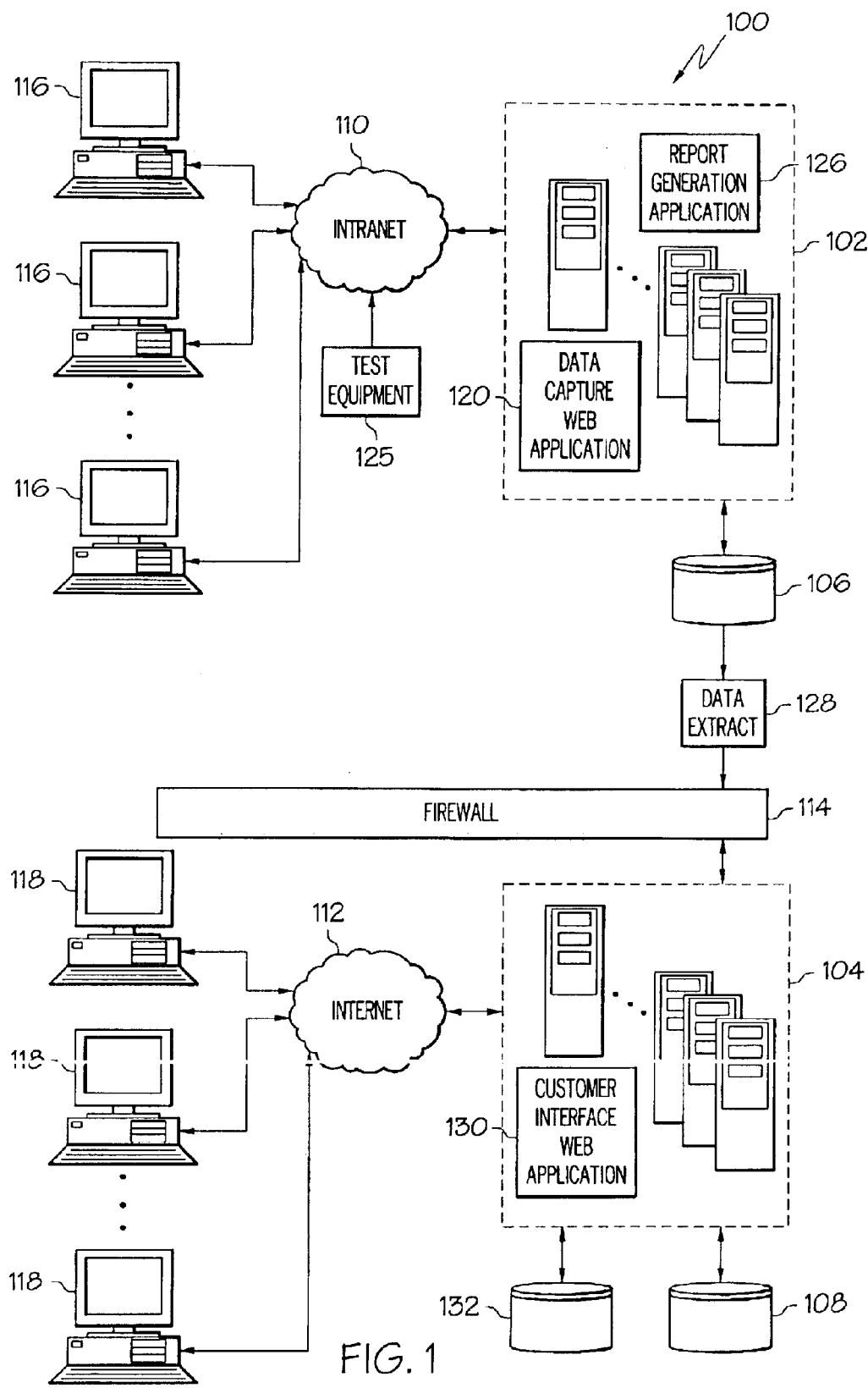
FIG. 1 is a functional block diagram of a system according to an exemplary embodiment of the present invention.

Before proceeding with a detailed description, a preliminary matter of connotation will first be addressed. Specifically, while it is recognized that there is a technological distinction between the Internet and the World Wide Web, the terms are used seemingly interchangeably throughout this description. The use of these terms in this fashion is for descriptive convenience only. The skilled artisan will appreciate that each of the described embodiments encompass the technological context of both the Internet and World Wide Web. It will additionally be appreciated that the term aerospace repair and overhaul refers to the repair and overhaul of aircraft components and engines, as well as gas turbine engine repair and overhaul for aircraft, marine, power, and other applications.

Turning now to the description, and with reference first to FIG. 1, an exemplary embodiment of a system that may be used to capture, store, and report aerospace repair and overhaul data will be described. The system 100 includes one or more first server computers 102, one or more second server computers 104, a repair and overhaul data storage database 106, and a customer repair and overhaul data supply database 108. The first server computers 102 are each in communication with one or more distributed communications networks. In the depicted embodiment, one of the distributed communications networks is a secure private network such as, for example, an Intranet 110, and another of the distributed communications networks is the Internet 112. The second server computers 104 are also in communication with the Intranet 110 and the Internet 112. However, as will be described more fully below, the second server computers 104, as well as the customer repair and overhaul data supply database 108, are preferably in communication with the Intranet 110 via a secure firewall 114.

Figure 2:
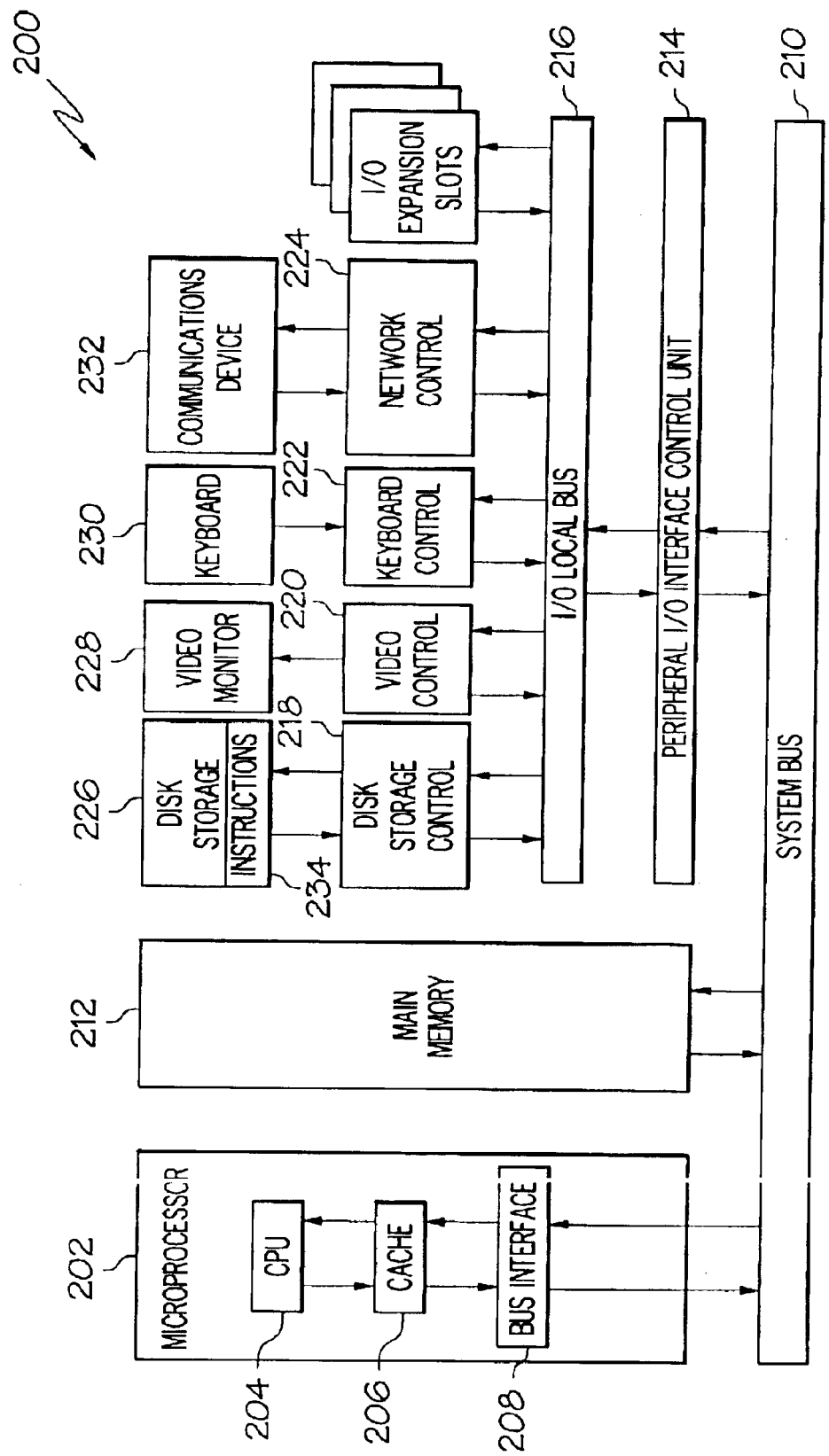
FIG. 2 is a functional block diagram of an exemplary general purpose computer that can be implemented as a server computer.

The first and second server computers 102 and 104 may be any one of numerous computer hardware systems known in the art. A functional block diagram of an exemplary general purpose computer that may be implemented as a server is shown in FIG. 2. The depicted general purpose computer 200 has a microprocessor 202, which includes a central processing unit (CPU) 204, memory cache 206, and bus interface circuitry 208. The microprocessor 202 communicates, via a system bus 210, to a main memory 212 and an I/O interface control unit 214. The I/O interface control unit 214 is operatively coupled, via an I/O local bus 216, to a disk storage controller 218, a video controller 220, and a keyboard controller 222. Each of these controllers is in turn operatively coupled to a disk storage device 226, a video monitor 228, and a keyboard 230, respectively.

The computer 200 also includes a network controller 224 that is operatively coupled to a communications device 232. The communications device is adapted to allow software objects, such as server software, hosted on the general purpose computer 200, to communicate with other computers via a distributed communications network. The disk storage device 226 stores various software components 234. The microprocessor 202 retrieves at least some of the software components 234 and stores each, either permanently or temporarily, in the main memory 212 for execution of these instructions. These software components 232 include at least an operating system and programming used to implement various operations and functions.

Returning to FIG. 1, the operating system that is used to control the overall operation of each of the server computers 102 and 104 may be any one of numerous known operating systems including, but not limited to, Unix, Solaris, Linux, Free BSD, and any one of the Windows-based operating systems. Similarly, the implementing software may be written using any one of numerous known programming languages including, but not limited to, JSP, Java, JavaBeans, C, C++, or a combination thereof.

It should be appreciated that one or more of the first and second server computers 102 and 104 may be used to implement different functions and applications. Thus, various ones of the first and second server computers 102 and 104 may each use different operating systems, since one operating system may be more compatible with the particular function that the particular first 102 or second 104 server computer is implementing. For example, as will be described more fully below, one or more of the first server computers 102 implements a data query and capture application, while one or more of the other first server computers 102 implements a report generation application. In a particular preferred embodiment, the first server computers 102 that implement the data query and capture application use a Unix operating system, and the first server computers 102 that implement the report generation application use a Windows-based (e.g., NT) operating system.

The repair and overhaul data storage database 106 is in communication with the first server computers 104. As will be described more fully below, the repair and overhaul data storage database 106 stores various aerospace product-related repair and overhaul data that is associated with the repair, overhaul, and maintenance of various aerospace products. In the depicted embodiment, the repair and overhaul data storage database 106 is implemented using one or more separate database hardware servers, though it could be an integral part of one or more of the first server computers 102. The repair and overhaul data storage database 106 is preferably implemented using Oracle 8i, due at least in part to its robustness and scalability, its Internet readiness, and its ability to use stored procedures that may be written in the Java programming language. It will be appreciated that the repair and overhaul data storage database 106 may implemented using various other database software implementation tools, non-limiting examples of which include Sybase, SQL, and Informix.

The customer repair and overhaul data supply database 108 is in communication with the second server computers 104 and with the repair and overhaul data storage database 106. The customer repair and overhaul data supply database 108, as will be described more fully below, stores, among other data, a subset of the aerospace product-related repair and overhaul data that is stored on the repair and overhaul data storage database 106. Similar to the repair and overhaul data storage database 106, the customer repair and overhaul data supply database 108 is implemented using one or more separate database hardware servers, though it could be an integral part of one or more of the second server computers 104. The customer repair and overhaul data supply database 108 is also preferably implemented using Oracle 8i, though various other database software implementation tools, such as those delineated above, could also be used.

A plurality of repair facility client computers 116 may communicate with one or more of the first server computers 102 via, for example, the Intranet 110, and a plurality of customer client computers 118 may communicate with the second server computers 104 via, for example, the Internet 112. Although not depicted, Internet access by a supplier client computer 118 may be implemented via an Internet Service Provider (ISP), a direct-dial-up modem connection, a digital subscriber link (DSL), a dedicated T-1 connection, or any one of numerous other known methods.

The system 100 is used, among other things, to capture, store, retrieve, and report aerospace repair and overhaul data. To do so, one of the applications that the first server computers 102 implement is a data capture web application 120. The data capture web application 120 implements an interactive data capture process with one or more authorized users, preferably via one or more formatted user interface web pages. The data capture web application also includes an administration component that is accessible only to authorized personnel. The administration component allows these authorized personnel to, among other things, manage user access rights, and the configuration of the formatted user interface web pages. An understanding of the administration component of the data capture web application 120 is not needed and will, therefore, not be discussed further.

Figure 3:
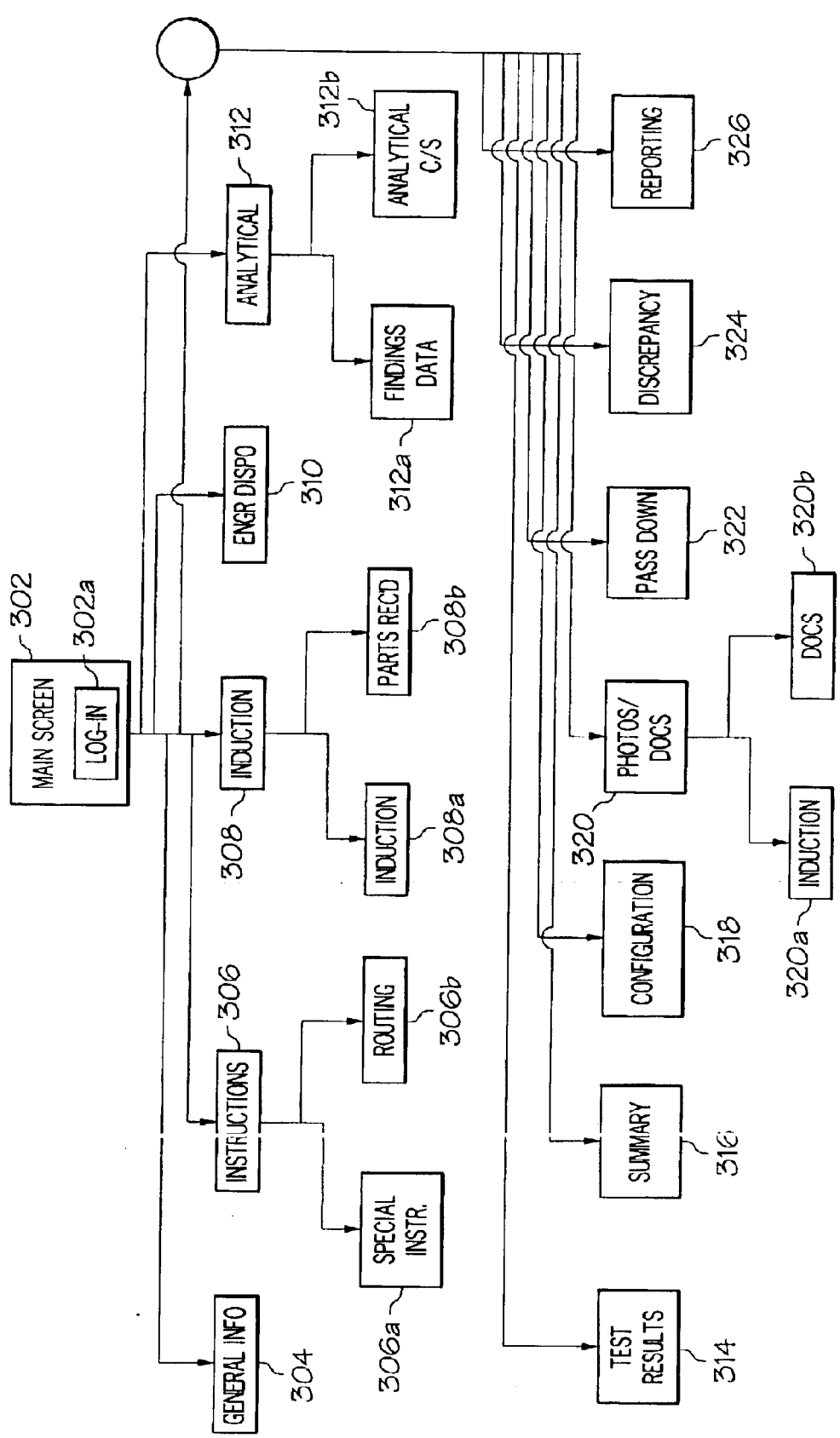
FIG. 3 is a high-level site map for a data capture and display web application according to an embodiment of the present invention.

A high-level site map for a particular preferred embodiment of the data capture web application 124 is depicted in FIG. 3. As the site map 300 shows, the data capture web application 120 includes at least thirteen main user interface web pages, though it will be appreciated that it could include more or less than this number. The main user interface web pages include a HOME page 302, a GENERAL INFO page 304, an INSTRUCTIONS page 306, an INDUCTION page 308, an ENGR DISPO page 310, an ANALYTICAL page 312, a TEST RESULTS page 314, a SUMMARY page 316, a CONFIGURATION page 318, a PHOTOS page 320, a PASS DOWN page 322, a DISCREPANCY page 324, and a REPORTING page 326.

In the depicted embodiment, some of the main user interface web pages include only a single display screen, while others include a plurality of display screens. For example, the GENERAL INFO page 304, the ENGR DISP page 310 the TEST RESULTS page 314, the SUMMARY page 316, the CONFIGURATION page 318, the PASS DOWN page 322, and the DISCREPANCY page 324 each include only a single display screen. On the other hand, the main INSTRUCTIONS page 306 includes both a Special Instr. screen 306a and a Routing screen 306b. Similarly, as FIG. 3 depicts, the main INDUCTION page 308 includes both an Induction screen 308a and a Parts Rec'd screen 308b, the main ANALYTICAL page 312 includes a Findings Data screen 312a and an Analytical C/S screen 312b, the main PHOTOS page 320 includes both a Photos screen 320a and a Docs screen 320b, and the REPORTING page 326 includes a Reports screen 326a and a Cust Profile screen 326b. It should be appreciated that the configuration of each of the main user interface web pages 302–326 could be varied and that the configurations depicted in FIG. 3 are merely exemplary of a particular embodiment.

When a user of one of the repair facility client computers 116 accesses a first server computer 102 and initiates the data capture web application 120, the HOME page 302 is initially displayed. From the HOME page 302, the user may then proceed to one or more log-in pages 302a where the user is prompted to enter and submit certain information such as, for example, a user-id and a password. Upon submission of a valid user-id and password, the user may then proceed to one or more of the remaining pages of the data capture web application 120 to initiate either the administration component or the process component.

Figure 4:
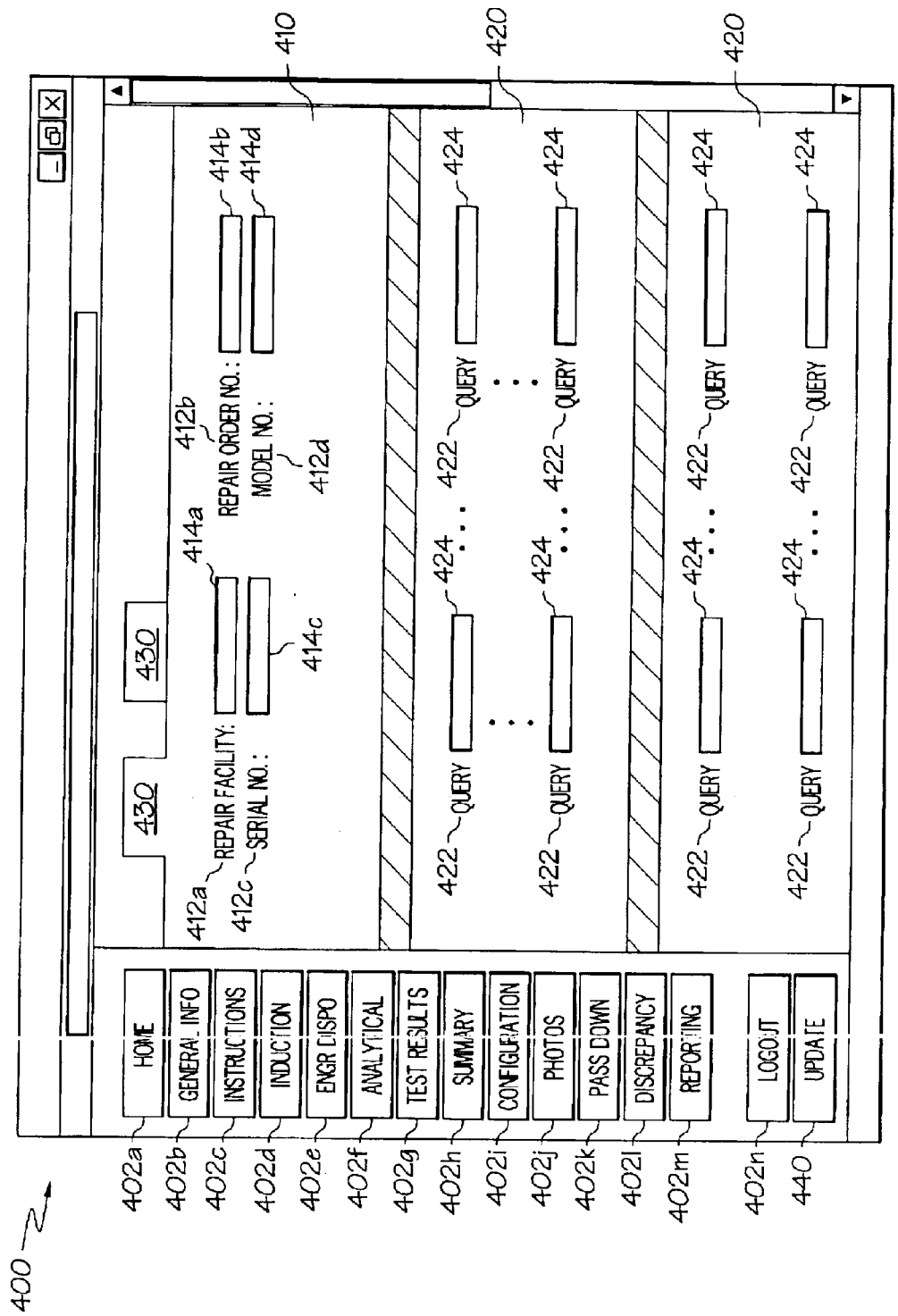
FIG. 4 is an exemplary web page that is displayed by the data capture and display web application.

Each of the remaining user interface main web page 304–326 is formatted to display one or more aerospace product-related repair and overhaul queries and associated data entry regions. The aerospace product-related repair and overhaul queries may be standard queries for all types of systems, parts, or components, or may be selectively generated from a set of stored queries, based at least in part on the particular type of system, part or component being repaired and/or overhauled at the facility. The aerospace product-related data entry regions are formatted to receive data from repair facility client computers 116 that are accessing the data capture web application 120. The aerospace product-related data entry regions may be formatted as drop-down selection menus, in which a user may select only data that is specified in the drop-down menu, or as a response selector, in which a user selects, for example, a "Yes" or a "No" in response to the displayed query. The aerospace product-related data entry regions may also be formatted as free data entry regions, in which a user is free to enter appropriate data as either text, image, video, or combination thereof. Thus, some pages may include one or more aerospace product-related data entry regions that may be used to enter a picture or video image, with another, adjacent data entry region that may be used to enter text that describes the image. The picture or video image may be selected from one or more image or video files stored in a data file directory. No matter the format, these data are preferably aerospace product-related repair and overhaul data associated with the respective aerospace product-related overhaul and repair query. To more clearly describe this, reference should now be turned to FIG. 4, which depicts an exemplary main user interface web page 400. This exemplary main user web page 400 is representative of each of the main user interface web pages 302–326. Thus, the configuration and layout of each individual main user interface web page 302–326 will not be separately described or depicted in detail.

Each main user interface web page 400 includes a plurality of links 402a–n to each of the main user interface web pages, and to a non-illustrated Logout page. Thus, if the user is presently displaying the GENERAL INFO page 304, but wants to display the main INSTRUCTIONS page 306, the user will select the appropriate link 402c to that page. Each main user interface web page 400 preferably displays aerospace product-related repair and overhaul queries and associated data entry regions in separate, data-related sections. For example, each main user interface web page 400 includes a repair order data section 410. In this section, the aerospace product-related repair and overhaul queries and associated data entry regions relate to specific repair order data. Hence, this section 410 includes, for example, aerospace product-related repair and overhaul queries and associate data entry regions, respectively, for a Repair Facility 412a, 414a, a Repair Order No. 412b, 414b, a Serial No. 412c, 414c, and a Model No. 412d, 414d. A user of the client computer 116 that is displaying the user interface page 400 may enter, or modify, data in one or more of the data entry regions 414 in the repair order data section.

Each main user interface web page 400, as was noted above, also includes one or more separate sections 420 that each include one or more aerospace product-related repair and overhaul queries 422 and associated data entry regions 424. These separate sections 420 display aerospace product-related repair and overhaul queries 422 and associated data entry regions 424 together in the same portion of each main user interface web page 400. It should be appreciated that the user may, in some instances, need to use a graphical scroll bar 405 to scroll up or down the user interface web page 400, as appropriate, to display all of the sections 420 included on a page 400. As was also noted above, some of the main user interface web pages 400 include one or more separate display screens, each of which may also include different sections. Thus, selection tabs 430 are provided for each of these separate display screens. For example, the INSTRUCTIONS page 306 would include two selection tabs 430, one each for the Special Instr. screen 306a and the Routing screen 306b.

Each main user interface web page 400 also displays, for example, an Update button 440. The Update button 440 allows the user to update the aerospace product-related repair and overhaul data stored in the repair and overhaul data storage database 106. More specifically, upon selection of the Update button 440, the data that is present in each of the data entry regions 414, 424 on the displayed page is appropriately stored in the repair and overhaul data storage database 106. Preferably, if improper or insufficient data is entered in one or more of the data entry regions 414, 424, the repair and overhaul data storage database 106 will not be updated, and the user will be prompted to enter the proper and/or sufficient data.

With the above-described general background in mind, the types of queries that are displayed on, and the concomitant data that is entered into, the main user interface web pages 302–326 will now be described in general. Before doing so, as was noted above, each of the main user interface web pages 302–326 includes the repair order data section 410. Thus, the specific descriptions of each page do not include reference to this section.

The main GENERAL INFO page 304 displays one or more aerospace product-related repair and overhaul queries 422 and data entry regions 424 that allow a user to enter therein general data. Such data includes, for example, the number of hours and cycles associated with the system, component, or part, and the reason (or reasons) the system, component, or part was removed.

The main INSTRUCTIONS page 306 includes the Special Instr. screen 306a and the Routing screen 306b. The aerospace product related repair and overhaul queries 422 and associated data entry regions 424 on the Special Instr. screen 306a relate to any special instructions that have been identified for the particular customer, part number, and/or serial number. This screen 306a may also display any associated authorizing documents, and any related queries 422 and associated data entry regions 424. The Routing screen 306b displays aerospace product-related repair and overhaul queries 422 and associated data entry regions 424 for general routing instructions, which may include one or more operation instructions. The operation instructions can consist of simple, single-step instructions, or multi-step instructions requiring data entry and capture.

The main INDUCTION page 308 includes the Induction screen 308a and the Parts Rec'd screen 308b. The aerospace product-related repair and overhaul queries 422 and associated data entry regions 424 for each of these screens 308a,b are generated based on, for example, the particular part model number and repair order number entered in the repair order data section 410. For example, the aerospace product-related repair and overhaul queries 422 displayed on the Induction screen 308a may differ for different engine model numbers. The specific queries 422 and associated data entry regions 424 in the Induction screen 308a relate to, for example, the condition and part numbers of the as-received system, and the condition and part numbers of one or more of its sections, components, and/or parts. The Parts Rec'd screen 308b, as its name connotes, displays queries 422 and data entry regions 424 related to any replacement parts received with the system, component, or part being repaired and/or overhauled.

The main ENGR DISPO page 310 is used to display and enter data related to the recommended and performed workscope for the particular system, part, or component being repaired and/or overhauled. The aerospace product-related repair and overhaul queries 422 and associated data entry regions 424 on this page are also generated based on the particular part model number and repair order number entered into the repair order data section 410.

The main ANALYTICAL page 312 includes the Findings Data screen 312a and the Analytical C/S screen 314b. The Findings Data screen 312a displays aerospace product-related repair and overhaul queries 422 and associated data entry regions 424 that allow a user to enter identified failure data by related areas, and to identify any detailed pans that may have contributed to the failed area. The Analytical C/S screen 312b will display the pars that were dispositioned for the particular repair/overhaul, and includes aerospace product-related repair and overhaul queries 422 and associated data entry regions 424 that are used by an Engineer to enter comments and/or notes, as that are associated with the dispositioned parts.

The TEST RESULTS page 314 includes aerospace product-related repair and overhaul queries 422 and associated data entry regions 424 into which the specified lab test results data, for both incoming and final tests, are entered. The aerospace product-related repair and overhaul queries 422 are generated, similar to some of those previously described, based on the particular part model number and repair order number entered into the repair order data section 410. The test results data may be manually entered into the data entry regions 424 by users, such as an Engineer. However, in a particular preferred embodiment, at least some of the test results data are automatically entered into the appropriate product-related data entry regions 424 from a test cell/test equipment. In this particular preferred embodiment, as shown in FIG. 1, one or more test cells and/or pieces of test equipment 125 are operatively coupled in communication with one or more of the first server computers 102 and/or the repair facility client computers 116, via the Intranet 110 or other local, or wide area, communications network.

The SUMMARY page 316 displays aerospace product-related repair and overhaul queries 422 and associated data entry regions 424 that relate to removal reasons. The queries 422 and associated data entry regions 424 are generated based on the particular part model number and repair order number entered into the repair order data section 410. With this page 316, a user, such as an Engineer, enters summary data associated with the primary and, if necessary, secondary reasons the system, component, and/or part was removed.

The main CONFIGURATION page 318 displays aerospace product-related repair and overhaul queries 422 and associated data entry regions 424 that provide traceability of various assemblies, subassemblies, and or individual parts issued with a specified repair order.

The main PHOTOS page 320 includes a Photos screen 320a and a Docs screen 320b. The Photos screen 320a and Docs screen 320b are used to select and attach digital image files and document text files, respectively. Each includes regions that allow various formats for both the image and text files to be selected. The digital image files may be either fixed (e.g., pictures) or video images.

The main PASS DOWN page 322 is a simple notes display page that includes queries 422 and associated data entry regions 424 that may be used by various personnel to enter and capture notes from various workers at various stages during the repair and/or overhaul process. For example, this page 322 includes sufficient data entry regions 424 so that at least analysts, mechanics, technicians, administrators, engineers and quality assurance personnel can enter and capture relevant notes.

The main DISCREPANCY page 324 includes queries 422 and associated data entry regions 424 that may be used by various personnel to enter and capture any discrepancies found during the repair and/or overhaul process, and to enter and capture a corrective action response for the discrepancy.

The REPORTING page 326 includes a Reports screen 326a and a Cust Profile screen 326b. The Reports screen 326 is used to select one or more types of reports that may be generated using the data associated with a specific identifier, such as a repair order number. The selected report types are generated using at least a portion of the aerospace product-related repair and overhaul data that was entered into the associated data entry regions 424 on each of the main user interface web pages 302–326, and stored in the repair and overhaul data storage database 106. The selectable report types include, for example, a complete customer engineering report, an induction report, a removal history report, and various types of metrics reports. The Reports screen 326a also allows a user to preview, print, e-mail, or export the selected report types in a selectable file format. The Cust Profile screen 326b allows a user to customize one or more reports for a particular customer. This screen 326b includes one or more queries 422 and associated data entry regions 424 that allow a user to enter a customer identifier such as, for example, a customer code, and to select and/or deselect certain types of information to be include and/or excluded, respectively, from the report to be generated for the identified customer.

With reference back to FIG. 1, each of the above-noted reports are generated by a report generation application 126.

Whenever a user selects one or more report types, and then commands the data capture web application 120 to preview, print, e-mail, or export the selected report types, the report generation application 126 is activated and generates the appropriate type of reports in the specified format and according to the selected customer profle. The report generation application 126 may be implemented using any one of numerous known software packages. However, in a particular preferred embodiment, the Crystal Reports® software package, developed and sold by Crystal Decisions of Palo Alto, Calif., is used.

With continued reference to FIG. 1, it is seen that at least a portion of the data that is stored in the repair and overhaul data storage database 106 is extracted, by a data extraction software module 128, and stored in the customer repair and overhaul data supply database 108. It will be appreciated that all of the data in the repair and overhaul data storage database 106 could be stored in the customer repair and overhaul data supply database 108. However, in the depicted embodiment, the repair and overhaul data storage database 106 stores data that may not be useful to customers, or that may be sensitive in nature and thus is undesirable to disclose to customers.

The data that is stored in the customer repair and overhaul data supply database 108, as was previously alluded to, is selectively accessible from the customer client computers 118. To access the data, a user of a customer client computer 118 accesses one or more of the second server computers 104 via, preferably, the Internet 112. The second server computers 104 implement, among other things, a customer interface web application 130. The customer interface web application 130 implements an interactive data retrieval process with one or more authorized users, via one or more formatted customer interface web pages.

Figure 5:
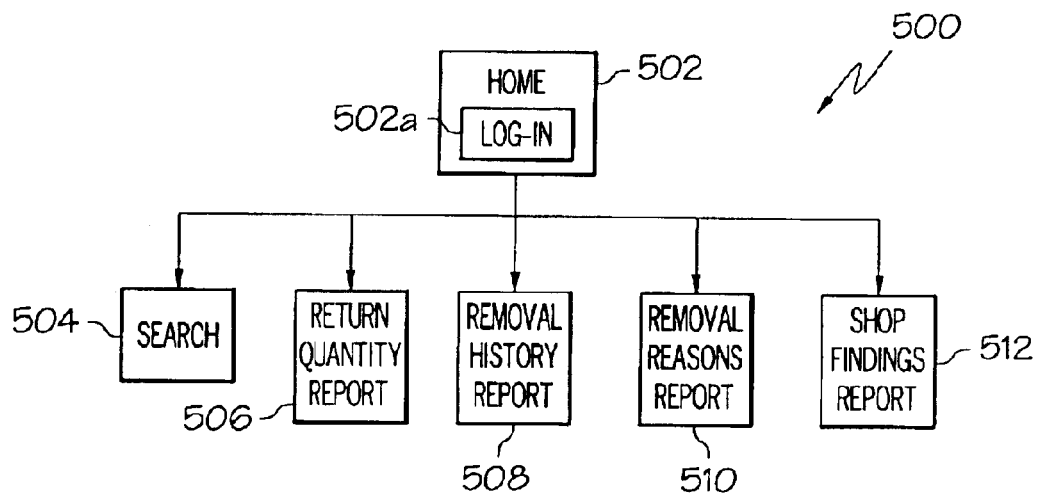
FIG. 5 is a high-level site map for a customer user interface web application according to an embodiment of the present invention.

A high level site map 500 for a particular preferred embodiment of the customer interface web application 130 is shown in FIG. 5. The customer interface web application 130 includes at least seven customer interface web pages, though it will be appreciated that it could include more or less than this number. The customer interface web pages include a HOME page 502, a SEARCH page 504, and four REPORTS pages, including a RETURN QUANTITY REPORT page 504, a REMOVAL HISTORY REPORT page 508, a REMOVAL REASONS REPORT page 510, and a SHOP FINDINGS REPORT page 512.

The HOME page 502 is initially displayed whenever a user of one of the customer client computers 118 accesses a second server computer 104 and initiates the customer interface web application 130. From the HOME page 502, the user may then proceed to a log-in page 502a, where the user is prompted to enter and submit certain authorized user information such as, for example, a username and password. A customer interface database 132, which is in communication with the second server computers 104, stores the authorized user information, and is accessed by the second server computers 104 to verify the user has entered and submitted valid user information into the log-in page 502a.

Figure 6:
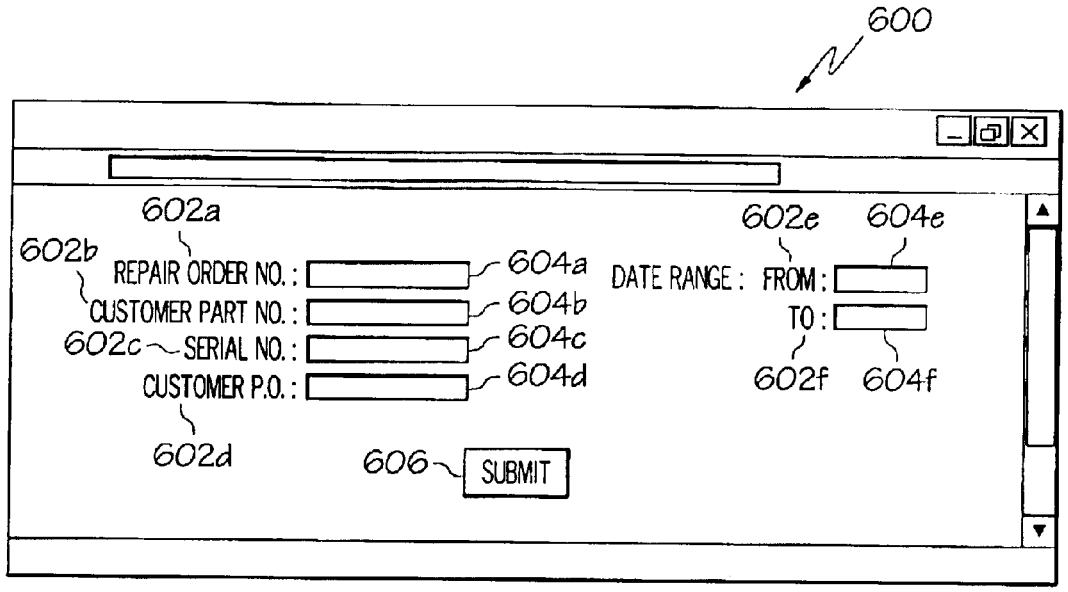
FIG. 6 is an exemplary web page that is displayed by the customer user interface web application and that is used to search for at least a portion of the data that is captured and stored by the data capture web application.

Upon submission of valid user information, the customer client computer user may then proceed to the SEARCH page 504 or to one of the REPORTS pages 506–512. The SEARCH page 504 allows customer client computer users to search and view, download, and/or print all of a customer's repair orders, to view, download, and/or print the status of each of the customer's repair orders found by the search, and to view, download, and/or print certain aerospace product-related repair and overhaul data associated with one or more of the customer's repair orders found by the search. The SEARCH page 504, an exemplary embodiment of which is shown in FIG. 6, includes one or more customer queries 602 and associated data entry regions 604. Non-limiting examples of such customer queries 602 and associated data entry regions 604 include, respectively, a Repair Order No. 602a, 604a, a Customer Part No. 602b, 604b, a Serial No. 602c, 604c, a Customer PO 602d, 604d, and a Date Range From/To 602e/f, 604e/f. A customer client computer user that is displaying the SEARCH page 504 may enter data into one or more of the associated data entry regions 604. The SEARCH page 504 also includes a Submit button 606 that, upon its selection, causes the second server computer 104 to initiate a search of the engineering data supply database 108 using the data entered into the customer query data entry regions 604.

The second server computer 104 will transmit the results of the search for display on the customer client computer 118 that submitted the search. The displayed results indicate the status of each associated repair order, and include one or more selectable hyperlinks that allow the customer client computer user to view certain aerospace product-related repair and overhaul data associated with the associated repair order. This aerospace product-related repair and overhaul data is limited to that which is stored in the customer repair and overhaul data supply database 108.

Figure 7:
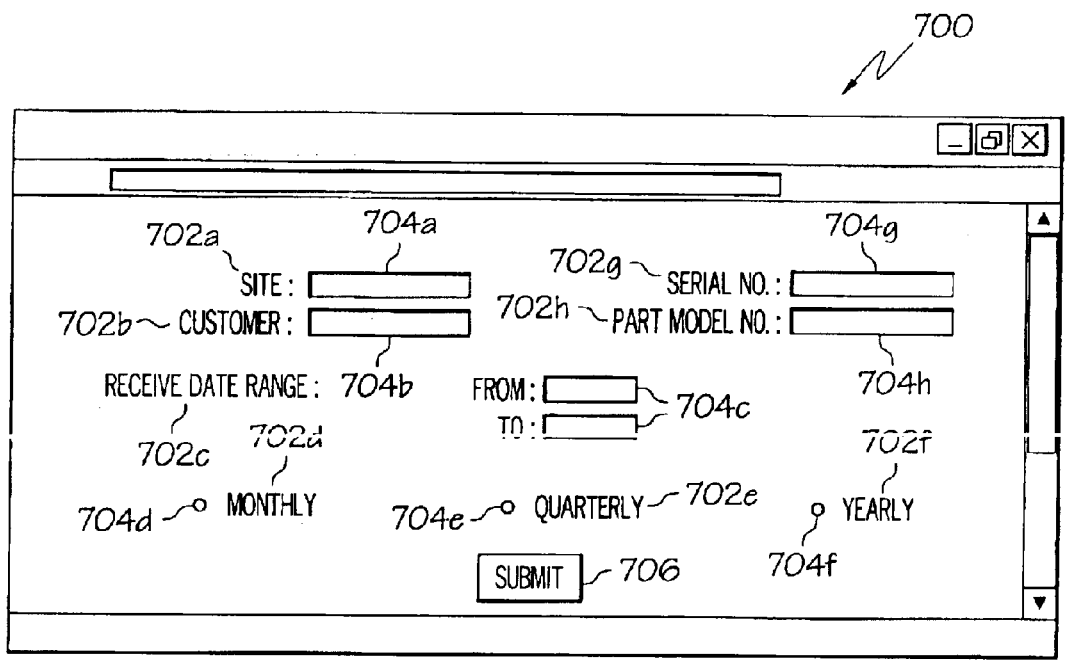
FIG. 7 is an exemplary web page that is displayed by the customer user interface web application and that is used to search for and display various reports based on at least a portion of the data that is captured and stored by the data capture web application.

Each of the REPORTS pages 506–512, an exemplary one of which is depicted in FIG. 7, are substantially similar to one another in that each is used to enter and submit certain search criteria that are used to retrieve and display data relevant to the particular report. Thus, each REPORTS page also includes one or more customer queries 702 and associated data entry regions 704. Non-limiting examples of the customer queries 702 and associated data entry regions 704 on the REPORTS pages include, respectively, the Repair & Overhaul Site 702a, 704a, the Customer 702b, 704b, a Receive Date Range 702c, 704c, and Selectors that allow the user to group the reported data by Month 702d, 704d, Quarter 702e, 704e, or Year 702f, 704f. One or more of the REPORTS pages may also include, as applicable, a Serial No. 702g, 704g, and/or a Part Model No. 702h, 704h. It will be appreciated that these customer queries 702 and associated data entry regions 704 are merely exemplary, and that each REPORTS page 506–512 may include more or less than these exemplary queries and data entry regions, as needed to retrieve the data and display the desired report.

Like the SEARCH page 504, the REPORTS pages each include a Submit button 706. Thus, once a customer client computer user enters that is displaying the desired REPORTS page enters data into a sufficient number of the displayed data entry regions 704, the user submits the data by selecting the Submit button 706. In response, the second server computer 104 initiates a search of the customer repair and overhaul data supply database 108 using the entered data, and transmits the results of the search for display on the customer client computer 118 that submitted the search as a report. The report may be displayed in any one of numerous forms. For example, the results may be displayed in tabular form, in graphical form, such as a bar chart or pie chart, or in simple text form. The user can also, in some instances, generate the report in multiple forms. For example, the user can generate a chart from data that is initially displayed in tabular form. No matter the form of the report, the user can print and/or download the report, as needed for a particular application.

Figure 8:
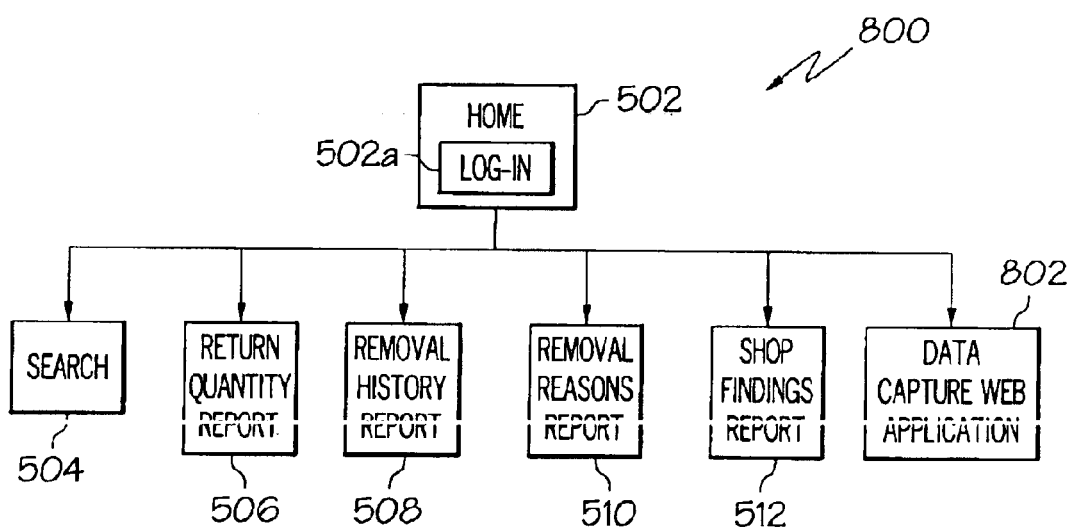
FIG. 8 is a high-level site map for a customer user interface web application according to an alternative embodiment of the present invention.

In an alternative embodiment, one or more of the second server computers 104 also implements a customer usable data capture web application 802, which is accessible from the customer interface web application 130. A high level site map 800 for this alternative embodiment is illustrated in FIG. 8. The customer usable data capture web application 802 includes one or more web pages that are substantially similar to those of the data capture web application 120 implemented on the first server computers 102. The customer usable data capture web application 802 allows customers and vendors to enter certain aerospace product-related repair and overhaul data themselves, and have the entered data stored on the repair and overhaul data storage database 106 and the customer repair and overhaul data supply database 108.

With the system and method described above, maintenance, repair, and overhaul data for aerospace systems, components, and parts, is efficiently captured, stored, and reported. The system and method also provides uniformity amongst various systems, parts, and components in the amount and type of data that is captured and stored, and stores the data in a centralized location that is accessible both by a company's workforce and, in some instances, its customers and vendors.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A system for capturing and reporting aerospace product-related repair and overhaul data, comprising:
   a first server computer operable to transmit one or more user interface web pages formatted to display one or more aerospace product-related repair and overhaul queries and associated data entry regions, each associated aerospace product-related repair and overhaul data entry region formatted to receive aerospace product-related repair and overhaul data entered therein from a client computer that is in operable communication with the first server computer and that is displaying one or more of the user interface web pages;
   a repair and overhaul data storage database in communication with the first server computer to receive and store at least a portion of the aerospace product-related repair and overhaul data entered into the associated aerospace product-related repair and overhaul data entry regions;
   a customer repair and overhaul data supply database coupled to receive and store at least a portion of the aerospace product-related repair and overhaul data from the repair and overhaul data storage database; and
   a second server computer in communication with the customer repair and overhaul data supply database and operable, in response to a command from a client computer that is in operable communication with the second server computer, to retrieve and transmit at least a portion of the aerospace product-related repair and overhaul data from the customer repair and overhaul data supply database.

2. The system of claim 1, wherein:
   the second server computer is further operable to transmit one or more customer interface web pages formatted to display one or more customer queries and associated data entry regions, each associated customer query data entry region formatted to receive customer query data entered therein from a client computer that is in operable communication with the second server computer and that is displaying one or more of the customer interface web pages; and
   the aerospace product-related repair and overhaul data that is retrieved from the customer repair and overhaul data supply database is based at least in part on the data entered into customer query data entry regions.

3. The system of claim 1, further comprising:
   a first report generation application stored in a memory that is accessible by the first server computer, the first report generation application operable, in response to a command from a client computer that is in operable communication with the first server computer, to generate a customer-specific report based at least in part on the aerospace product-related repair and overhaul data stored in the repair and overhaul data storage database.

4. The system of claim 3, further comprising:
   a second report generation application stored in a memory that is accessible by the second server computer, the second report generation application operable, in response to a command from a client computer that is in operable communication with the second server computer, to generate a customer-specific report based at least in part on the aerospace product-related repair and overhaul data stored in the customer repair and overhaul data supply database.

5. The system of claim 1, wherein the first server computer is further operable to receive image data from a client computer and store the received image data in the product-related repair and overhaul data storage database.

6. The system of claim 5, wherein the image data is one of at least static image data and dynamic video image data.

7. The system of claim 1, further comprising:
   a customer interface database coupled to the second server computer, the customer interface database having customer identification data stored thereon.

8. The system of claim 1, wherein the first server computer is adapted to receive test data from one or more test devices and store the test data in the repair and overhaul data storage database.

9. The system of claim 1, further comprising:
   a data extraction application stored in a memory accessible by at least the first server computer and operable to extract a portion of the data stored in the repair and overhaul data storage database.

10. The system of claim 9, wherein the customer repair and overhaul data supply database is coupled to receive the data extracted from the repair and overhaul data storage database by the data extraction application.

11. The system of claim 1, wherein one or more of the aerospace product-related repair and overhaul queries and associated data entry regions displayed on the user interface web pages arc generated based at least in part on product identification data.

12. A method of capturing and reporting aerospace product-related repair and overhaul data, comprising:
   transmitting one or more user interface web pages formatted to display one or more aerospace product-related repair and overhaul queries and associated data entry regions, each associated aerospace product-related repair and overhaul data entry region formatted to receive aerospace product-related repair and overhaul data entered therein from a client computer that is displaying one or more of the interface web pages;

receiving and storing at least a portion of the aerospace product-related repair and overhaul data entered into the associated aerospace product-related repair and overhaul data entry regions in a repair and overhaul data storage database;

receiving and storing at least a portion of the aerospace product-related repair and overhaul data from the repair and overhaul data storage database in a customer repair and overhaul data supply database; and retrieving and transmitting at least a portion of the aerospace product-related repair and overhaul data from the customer repair and overhaul data supply database, in response to a command from a client computer.

13. The method of claim 12, further comprising:

transmitting one or more customer interface web pages formatted to display one or more customer queries and associated data entry regions, each associated customer query data entry region formatted to receive customer query data entered therein from a client computer that is displaying one or more of the customer interface web pages, wherein the aerospace product-related repair and overhaul data that is retrieved from the customer repair and overhaul data supply database is based at least in part on the data entered into customer query data entry regions.

14. The method of claim 12, further comprising:

generating a customer-specific report based at least in part on the aerospace product-related repair and overhaul data stored in the repair and overhaul data storage database.

15. The method of claim 14, further comprising:

generating a customer-specific report based at least in part on the aerospace product-related repair and overhaul data stored in the customer repair and overhaul data supply database.

16. The method of claim 12, further comprising:

receiving and storing image data in the repair and overhaul data storage database.

17. The method of claim 16, wherein the image data is one of at least static image data and dynamic video image data.

18. The method of claim 12, further comprising:

storing customer identification data in a customer interface database.

19. The method of claim 12, further comprising:

receiving test data from one or more test devices; and storing the received test data in the repair and overhaul data storage database.

20. The method of claim 12, further comprising:

extracting a portion of the data stored in the repair and overhaul data storage database.

21. The method of claim 20, further comprising:

storing the data extracted from the repair and overhaul data storage database in the customer repair and overhaul data supply database.

22. The method of claim 12, further comprising:

generating one or more of the aerospace product-related repair and overhaul queries and associated data entry regions based at least in part on product identification data.

23. A computer-readable storage medium containing computer executable code for instructing one or more server computers to perform the steps of:

transmitting one or more user interface web pages formatted to display one or more aerospace product-related repair and overhaul queries and associated data entry regions, each aerospace product-related repair and overhaul data entry region formatted to receive aerospace product-related repair and overhaul data entered therein from a client computer that is displaying one or more of the interface web pages;

receiving and storing at least a portion of the aerospace product-related repair and overhaul data entered into the associated aerospace product-related repair and overhaul data entry regions in a repair and overhaul data storage database;

receiving and storing at least a portion of the aerospace product-related repair and overhaul data from the repair and overhaul data storage database in a customer repair and overhaul data supply database; and retrieving and transmitting at least a portion of the aerospace product-related repair and overhaul data from the customer repair and overhaul data supply database, in response to a command from a client computer.

24. The storage medium of claim 23, further comprising the steps of:

transmitting one or more customer interface web pages formatted to display one or more customer queries and associated data entry regions, each associated customer query data entry region formatted to receive customer query data entered therein from a client computer that is displaying one or more of the customer interface web pages, wherein the aerospace product-related repair and overhaul data that is retrieved from the customer repair and overhaul data supply database is based at least in part on the data entered into customer query data entry regions.

25. The storage medium of claim 23, further comprising the steps of:

generating a customer-specific report based at least in part on the aerospace product-related repair and overhaul data stored in the repair and overhaul data storage database.

26. The storage medium of claim 23, further comprising the steps of:

generating a customer-specific report based at least in part on the aerospace product-related repair and overhaul data stored in the customer repair and overhaul data supply database.

27. The storage medium of claim 23, further comprising the steps of:

receiving and storing image data in the repair and overhaul data storage database.

28. The storage medium of claim 27, wherein the image data is one of at least static image data and dynamic video image data.

29. The storage medium of claim 23, further comprising the steps of:

storing customer identification data in a customer interface database.

30. The storage medium of claim 23, further comprising the steps of:

receiving test data from one or more test devices; and storing the received test data in the repair and overhaul data storage database.

31. The storage medium of claim 23, further comprising the steps of:

extracting a portion of the data stored in the repair and overhaul data storage database.

32. The storage medium of claim 31, further comprising the steps of:

storing the data extracted from the repair and overhaul data storage database in the customer repair and overhaul data supply database.

33. The storage medium of claim 23, further comprising the steps of:

generating one or more of the aerospace product-related repair and overhaul queries and associated data entry regions based at least in part on product identification data.

* * * * *